Patented Apr. 17, 1945

2,373,887

UNITED STATES PATENT OFFICE 2,373,887

MANUFACTURE OF HYDROQUINONE

Bruce B. Gralow, New Brunswick, N. J., assignor to E. I. du Pont de Nemours & Company, Wilmington, Del., a corporation of Delaware No Drawing. Application December 4, 1943, Serial No. 512,983

3 Claims. (Cl. 260—621)

This invention relates to the manufacture of hydroquinone, and especially to improvements in manufacturing hydroquinone wherein quinone is reduced to hydroquinone in an acid medium in the presence of a metal, and the hydroquinone which is partly in slurry and partly dissolved in the resulting mixture which contains by-products of the reaction is recovered by extracting with a water-insoluble liquid organic solvent.

In such processes the quinone is commonly produced by oxidation of aniline sulfate by the action of manganese dioxide in an aqueous sulfuric acid medium, wherein some by-product tarry material and silicious material derived from the manganese dioxide are present along with any unconsumed excess of manganese dioxide. The quinone is then reduced to hydroquinone by reduction with nascent hydrogen which is generated in the acid solution by adding a metal, preferably finely divided, such as iron. Besides hydroquinone, the resultant acid solution contains tars, carbonaceous material, silicious material and other finely divided solids. In the recovery of hydroquinone from the resultant acid medium by extracting with a water insoluble liquid organic solvent, such as diethyl ether, the considerable agitation of the mixture employed in the extraction forms a troublesome persistent emulsion, often containing as much as 2% of the insoluble materials besides tarry material and considerable hydroquinone. The emulsion is difficult to separate from the hydroquinone extract and its separation required laborious time consuming operations, the use of additional process equipment and the operation resulted eventually in loss of some hydroquinone. Thus the formation of the emulsion lowers the efficiency of the process in time, labor, equipment and recovery, and it was desirable to provide means for improving the process.

It is among the objects of the present invention to provide improvements in the processes for manufacturing hydroquinone. Another object of the invention is to provide means for preventing the formation of emulsions with organic solvents which are used to extract hydroquinone from aqueous solutions containing emulsion inducing materials. Other objects of the invention will be apparent from the following description.

The objects of the invention are attained in general by partially neutralizing the hydroquinone-containing acid reaction medium resulting from the described reduction of quinone before the extraction is started so that the pH value thereof will be increased to a value of about 2.5 to about 5.0 whereby the formation of the emulsions is prevented.

The invention will be more fully set forth in the following more detailed description which includes examples that are given as illustrative embodiments of the invention and not as limitations thereof. Parts are expressed in parts by weight unless otherwise noted.

Example I

Quinone is formed, in accordance with prior art procedure, by mixing a hydrous solution of aniline sulfate, manganese dioxide, and an excess of sulfuric acid and allowing the reaction to proceed. The quinone is then reduced to hydroquinone by the action of nascent hydrogen which is produced in the reaction mixture by the action of the acid on sub-divided iron, such as iron filings. This produces a final mixture having a pH value of about 0.5 to 1.5 and the mixture contains tarry substances, salts resulting from the reactions and residual impurities from the reactants, some of which are insoluble, such as carbon from the iron filings, all of which operations are performed in the manner known to the art.

If extracted with an organic solvent at this point, emulsions are formed which impair both the yield and the quality of the product. In accordance with the present invention, caustic soda is added to the mixture before extracting until the pH value is raised to about 2.5 to about 5.0. Finally the latter mixture is extracted with a suitable liquid organic solvent and the hydroquinone is separated in solution in the organic solvent. Deleterious emulsions are not formed by the agitation which is necessary to effect the extraction.

More particularly, in an operation of the above description, the pH value of the acid reaction mixture containing the hydroquinone was adjusted to a pH value of 3.5 to 4.0 by adding 50% caustic soda solution. The entire batch was then passed through extraction columns countercurrent to an equal volume of diethyl ether wherein the liquor and solvent were intimately mixed. The diethyl ether extract containing the extracted hydroquinone readily separated from the liquor and any small amount of non-extract mechanically occluded quickly separated from the extract upon standing.

The diethyl ether extract was passed to stills where the solvent was evaporated. The hydroquinone residue was taken up in hot water from which upon cooling and processing in the well known manner, it was recrystallized.

A similar final reaction medium having a pH value of 0.5 to 1.5 was treated for extraction of hydroquinone with the same solvent and in the manner like that described in Example 1, except that no alkali was added to increase the pH value thereof. A large amount of acid-stable emulsion having about the same specific gravity as the extract was formed and could not be completely separated upon standing. The emulsion interfered with the distillation and the hydroquinone recovered from the still contained tarry substances and solids which required difficult and additional steps to separate them from the hydroquinone. Some of the emulsion which also contained hydroquinone could not be broken in separators provided to separate solids from the extract. It had to be removed from the separators and passed to the sewer with its non-recoverable content of hydroquinone. Some of the tar-containing emulsion was also retained in the extraction column where a constantly increasing accumulation of muck was formed. This muck also contained non-recoverable solvent and hydroquinone, and it finally reached such proportions that it had to be passed to the sewer. Such non-recoverable losses amounted to a decreased yield of as much as 5% as compared to the operation in which the acidic mixture before extraction was adjusted to a pH value of 2.5 to 5.0.

*Example 2*

In another run carried out similarly to Example 1, the acid in the resulting reaction mixture was neutralized until the pH value thereof was 5.0. Results soimilar to those attained in Example 1 were attained.

Similar neutralization of the acid in the reaction medium resulting from the reduction of quinone until the resultant medium had a pH value of about 2.5 was found to eliminate the formation of emulsions and to give yields comparing favorably with those of Example 1.

Adjustment to a higher pH value than about 5.0 commonly results in the precipitation of metal hydroxides which should be avoided. Any alkali which forms water soluble sulfates can be used to neutralize the excess of acid, but the alkalies of the alkali metals, such as sodium hydroxide or carbonate, are preferable because of their high solubility. Best results are obtained when the pH value is adjusted to about 4.0 to about 4.5 before extraction.

Any water-insoluble liquid organic solvent for hydroquinone which is inert toward the reaction mixture, except as a solvent, can be used instead of that set forth in the foregoing illustrations, such as ethyl acetate and methylpropyl ketone. Any suitable proportion of extractant, either more or less than that specified in the examples can be used.

From the foregoing disclosure it will be recognized that the invention is susceptible of modification without departing from the spirit and scope thereof and it is to be understood that the invention is not restricted to the specific illustrations thereof herein set forth.

I claim:

1. In the process of manufacturing hydroquinone where in quinone is reduced to hydroquinone in acid aqueous medium by the action of acid on a metal added to the medium, and the hydroquinone resulting from such reduction is extracted from the resultant medium by agitating with an inert liquid water insoluble organic solvent, the step which comprises adding an acid neutralizing agent of an alkali which forms soluble sulfates to said resultant aqueous medium before the hydroquinone is extracted and until the pH value of said medium is adjusted to about 2.5 to about 5.0, for preventing the formation of an emulsion when said medium is agitated with said solvent.

2. The process in accordance with claim 1 in which the acid neutralizing agent is an alkali of an alkali metal.

3. The process in accordance with claim 1 in which the medium is adjusted to a pH value of about 4.0 to about 4.5.

BRUCE B. GRALOW.